US012674660B2

(12) United States Patent
Gao et al.

(10) Patent No.: US 12,674,660 B2
(45) Date of Patent: Jul. 7, 2026

(54) THREE-DIMENSIONAL MEASUREMENT METHOD AND APPARATUS FOR STRUCTURED LIGHT SYSTEM BASED ON SYSTEM POSE OPTIMIZATION

(71) Applicant: GUANGDONG UNIVERSITY OF TECHNOLOGY, Guangzhou (CN)

(72) Inventors: Jian Gao, Guangzhou (CN); Zepan Chen, Guangzhou (CN); Zhuojun Zheng, Guangzhou (CN); Lanyu Zhang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 19/284,333

(22) Filed: Jul. 29, 2025

(65) Prior Publication Data

US 2025/0354804 A1     Nov. 20, 2025

Related U.S. Application Data

(63) Continuation of application No. PCT/CN2024/126453, filed on Oct. 22, 2024.

(30) Foreign Application Priority Data

May 6, 2024     (CN) ......................... 202410544321.1

(51) Int. Cl.
*G01B 11/25*          (2006.01)
*G06T 7/521*          (2017.01)
(Continued)

(52) U.S. Cl.
CPC .............. *G01B 11/25* (2013.01); *G06T 7/521* (2017.01); *G06T 7/80* (2017.01); *H04N 17/002* (2013.01); *G06T 2207/30244* (2013.01)

(58) Field of Classification Search
CPC ........... G01B 11/25; G06T 7/521; G06T 7/80; G06T 7/0004; G06T 2207/30244; H04N 17/00; H04N 17/002
(Continued)

(56) References Cited

U.S. PATENT DOCUMENTS

| | | | |
|---|---|---|---|
| 2021/0254968 A1 | 8/2021 | Kushevsky et al. | |
| 2023/0074445 A1 | 3/2023 | Gao et al. | |
| 2023/0076442 A1* | 3/2023 | Zheng .................. | G06T 15/005 |

FOREIGN PATENT DOCUMENTS

| | | |
|---|---|---|
| CN | 105806259 A | 7/2016 |
| CN | 111578860 A | 8/2020 |

(Continued)

OTHER PUBLICATIONS

Internation Search Report of PCT/CN2024/126453, Mailed Jan. 24, 2025.

(Continued)

*Primary Examiner* — Sherrie Hsia

(57)          ABSTRACT

A three-dimensional measurement method and apparatus for a structured light system based on system pose optimization is provided. The method includes acquiring multiple binary fringe modulations and performing intrinsic and extrinsic parameter calibration of a projector and a camera by using a preset visual positioning method to determine an initial inter-optical-center horizontal distance; calculating system distance magnification data based on each sinusoidal fringe image and the initial inter-optical-center horizontal distance; determining defocus phase undetermined coefficients based on each binary fringe modulation; applying a preset system pose optimization mathematical model to determine a target inter-optical-center horizontal distance based on the initial inter-optical-center horizontal distance, the system distance magnification data, and the defocus phase undetermined coefficients; and adjusting the system pose of the structured (Continued)

light system based on the target inter-optical-center horizontal distance, and constructing a three-dimensional model of an object to be measured based on the triangulation method.

6 Claims, 7 Drawing Sheets

(51) Int. Cl.
    *G06T 7/80*          (2017.01)
    *H04N 17/00*        (2006.01)

(58) Field of Classification Search
    USPC ................ 348/180; 382/100, 106, 141, 154;
                        356/601–604; 345/419
    See application file for complete search history.

(56)              References Cited

FOREIGN PATENT DOCUMENTS

| CN | 114509024 | A | 5/2022 |
|----|-----------|---|--------|
| CN | 114526692 | A | 5/2022 |
| CN | 115854921 | A | 3/2023 |
| CN | 116878382 | A | 10/2023 |
| CN | 117073579 | A | 11/2023 |
| CN | 117387523 | A | 1/2024 |
| JP | 2015137897 | A | 7/2015 |
| JP | 2017220867 | A | 12/2017 |

OTHER PUBLICATIONS

Wang Hai, "Research on 3D measurement method based on line structured light", China Master's Theses Full-text Database, Basic Science Section, No. 1, Jan. 15, 2023, entire document.
Zewei Cai et al., "Ray calibration and phase mapping for structured-light-field 3D reconstruction", Optics Express, vol. 26, No. 6, Mar. 19, 2018, pp. 7598-7613.
Zheng Zhuojun, "Binary Defocusing Theory and Method for High-speed Large-depth-range Structured Light 3D Measurement", Wanfang Thesis, Oct. 18, 2023, entire document.
Qing Mei et al., "Structure light telecentric stereoscopic vision 3D measurement system based on Scheimpflug condition", Optics and Lasers in Engineering, May 31, 2016, pp. 83-91.

\* cited by examiner

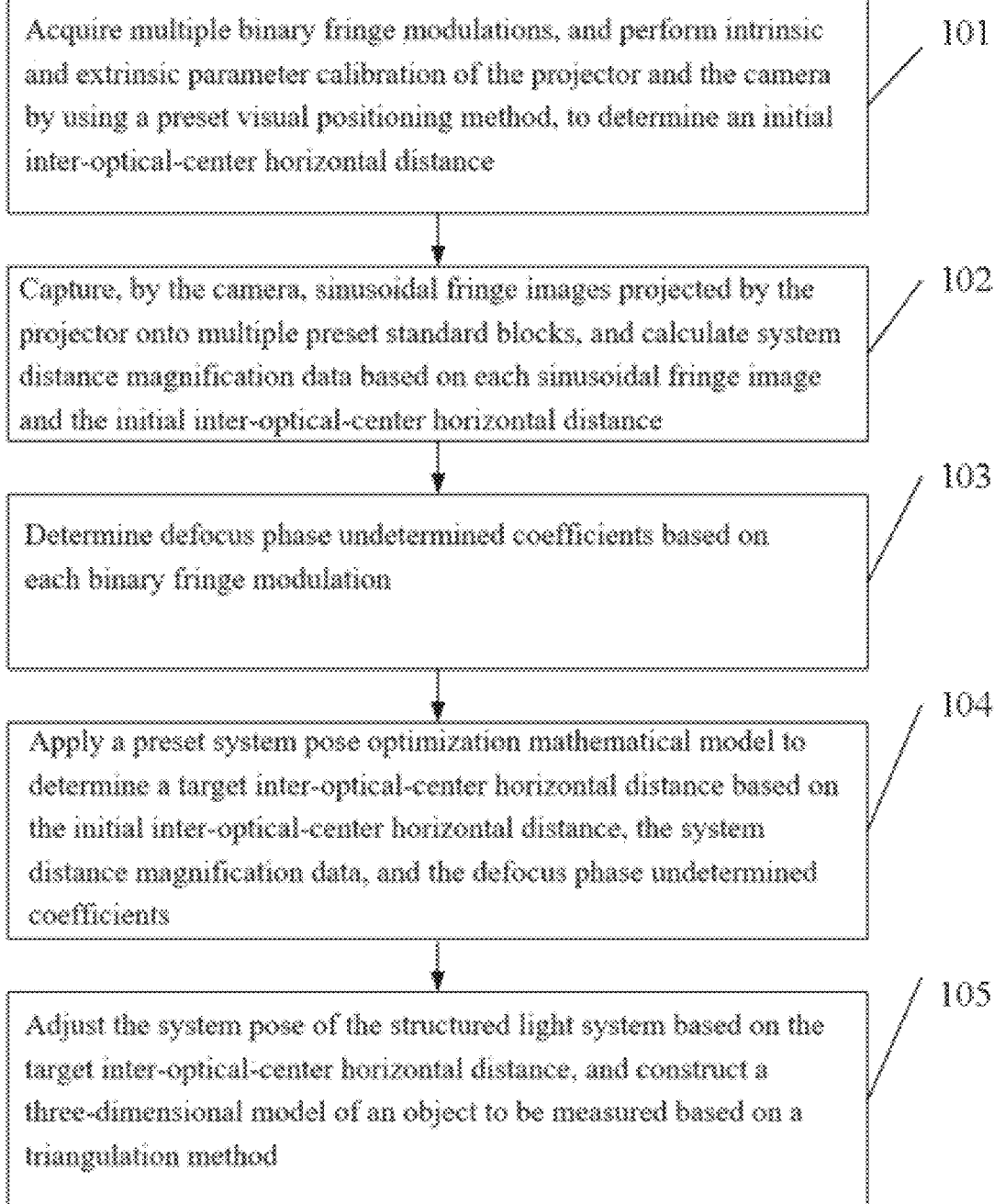

Acquire multiple binary fringe modulations, and perform intrinsic and extrinsic parameter calibration of the projector and the camera by using a preset visual positioning method, to determine an initial inter-optical-center horizontal distance — 101

Capture, by the camera, sinusoidal fringe images projected by the projector onto multiple preset standard blocks, and calculate system distance magnification data based on each sinusoidal fringe image and the initial inter-optical-center horizontal distance — 102

Determine defocus phase undetermined coefficients based on each binary fringe modulation — 103

Apply a preset system pose optimization mathematical model to determine a target inter-optical-center horizontal distance based on the initial inter-optical-center horizontal distance, the system distance magnification data, and the defocus phase undetermined coefficients — 104

Adjust the system pose of the structured light system based on the target inter-optical-center horizontal distance, and construct a three-dimensional model of an object to be measured based on a triangulation method — 105

FIG. 1

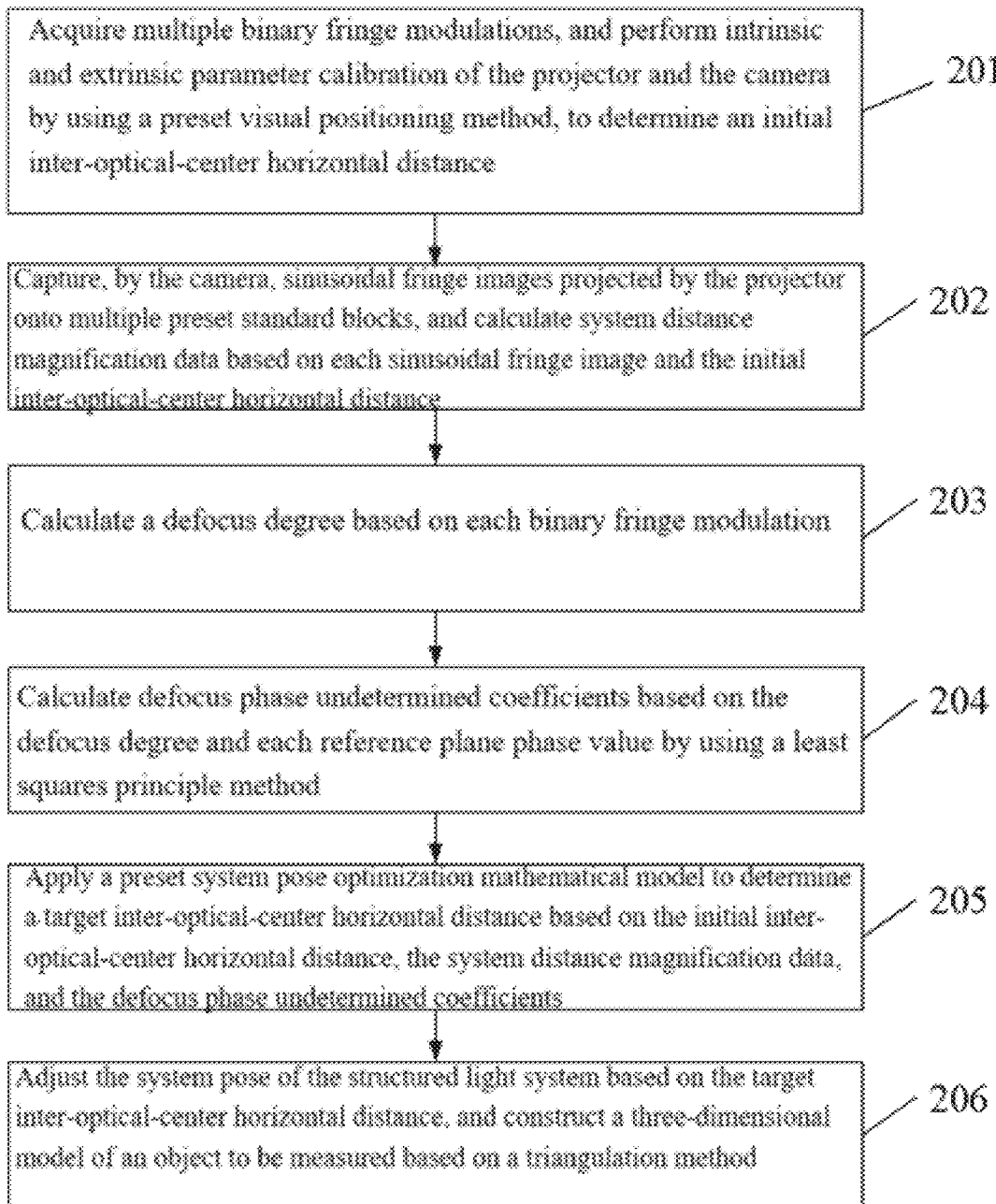

Acquire multiple binary fringe modulations, and perform intrinsic and extrinsic parameter calibration of the projector and the camera by using a preset visual positioning method, to determine an initial inter-optical-center horizontal distance — 201

Capture, by the camera, sinusoidal fringe images projected by the projector onto multiple preset standard blocks, and calculate system distance magnification data based on each sinusoidal fringe image and the initial inter-optical-center horizontal distance — 202

Calculate a defocus degree based on each binary fringe modulation — 203

Calculate defocus phase undetermined coefficients based on the defocus degree and each reference plane phase value by using a least squares principle method — 204

Apply a preset system pose optimization mathematical model to determine a target inter-optical-center horizontal distance based on the initial inter-optical-center horizontal distance, the system distance magnification data, and the defocus phase undetermined coefficients — 205

Adjust the system pose of the structured light system based on the target inter-optical-center horizontal distance, and construct a three-dimensional model of an object to be measured based on a triangulation method — 206

FIG. 2

THREE-DIMENSIONAL MEASUREMENT METHOD AND APPARATUS FOR STRUCTURED LIGHT SYSTEM BASED ON SYSTEM POSE OPTIMIZATION

CROSS-REFERENCE TO RELATED APPLICATIONS

This application is a continuation of International Patent Application No. PCT/CN2024/126453 with a filing date of Oct. 22, 2024, designating the United States, now pending, and further claims priority to Chinese Patent Application No. 202410544321. 1 with a filing date of May 6, 2024. The content of the aforementioned applications, including any intervening amendments thereto, are incorporated herein by reference.

TECHNICAL FIELD

The present application relates to the technical field of optical three-dimensional measurement, and particularly relates to a three-dimensional measurement method and apparatus for a structured light system based on system pose optimization.

BACKGROUND OF THE PRESENT application

Structured light three-dimensional measurement technology has been widely applied in fields such as industrial inspection, machine vision, cultural relic digitization, and medicine due to its advantages of non-contact, full-field non-destructive measurement, high precision, and rapid measurement. As a typical configuration, a structured light three-dimensional measurement system including a camera and a projector has attracted widespread attention due to its simple structure and high efficiency.

In a typical single-camera structured light three-dimensional measurement system, a projector projects a fringe pattern onto a surface of a measured object. At the same time, the camera captures the deformed fringe pattern modulated by a height of the measured object. By processing the deformed fringe pattern, phase information representing the height of the measured object is calculated. Finally, combining the phase information and calibrated system parameters, the height and three-dimensional information of the measured object is acquired by using the triangulation principle. This system design is simple and efficient for point cloud reconstruction, making it an important tool in the field of structured light measurement.

Most existing structured light three-dimensional measurement methods employ defocus projection technology of the binary fringe pattern. When performing defocus projection of the binary fringe patterns, the defocus effect of the projection system is regarded as a low-pass filter. However, due to the unknown low-pass filtering characteristics of the projection system, it is difficult to adjust the defocus amount of the entire system to achieve an appropriate defocus level. This may result in either excessive or insufficient defocus, leading to insufficient measurement accuracy in three-dimensional measurements.

SUMMARY OF THE PRESENT APPLICATION

The present application provides a three-dimensional measurement method and apparatus for a structured light system based on system pose optimization, which aims to solve the technical problem that existing structured light three-dimensional measurement methods have difficulty in adjusting the defocus amount of the entire system to achieve an appropriate defocus level, resulting in insufficient measurement accuracy in three-dimensional measurement.

A first aspect of the present application provides a three-dimensional measurement method for a structured light system based on system pose optimization. The structured light system includes a projector and a camera. The method includes:

acquiring multiple binary fringe modulations and perform intrinsic and extrinsic parameter calibration of the projector and the camera using a preset visual positioning method to determine an initial inter-optical-center horizontal distance;

capturing, by the camera, sinusoidal fringe images projected by the projector onto multiple preset standard blocks, and calculating system distance magnification data based on each sinusoidal fringe image and the initial inter-optical-center horizontal distance;

determining defocus phase undetermined coefficients based on each binary fringe modulation;

applying a preset system pose optimization mathematical model to determine a target inter-optical-center horizontal distance based on the initial inter-optical-center horizontal distance, the system distance magnification data, and the defocus phase undetermined coefficients;

adjusting the system pose of the structured light system based on the target inter-optical-center horizontal distance, and constructing a three-dimensional model of an object to be measured based on a triangulation method.

Optionally, the preset visual positioning method includes a monocular visual positioning method and a binocular visual positioning method. The calibrating the intrinsic and extrinsic parameters of the projector and the camera using the preset visual positioning method to determine the initial inter-optical-center horizontal distance includes:

performing intrinsic parameter calibration on the projector and the camera separately using the monocular visual positioning method, to determine projector intrinsic parameters and camera intrinsic parameters;

performing extrinsic parameter calibration on the projector using the binocular visual localization method, the projector intrinsic parameters and the camera intrinsic parameters, to determine projector extrinsic parameters;

determining the initial inter-optical-center horizontal distance based on the projector extrinsic parameters.

Optionally, the system distance magnification data includes a camera working distance and projector fringe magnification data. The calculating the system distance magnification data based on each sinusoidal fringe image and the initial inter-optical-center horizontal distance includes:

performing phase demodulation on each sinusoidal fringe image using an N-step phase-shifting method to generate a wrapped phase corresponding to each sinusoidal fringe image;

normalizing each wrapped phase using a multi-frequency heterodyne method to output an absolute phase map;

selecting a standard block phase value of each preset standard block and a reference plane phase value corresponding to each standard block phase value from the absolute phase map;

performing difference operations between each standard block phase value and the corresponding reference plane phase value to output multiple phase difference values;

substituting the initial inter-optical-center horizontal distance, each phase difference value, and a standard block height of each preset standard block into a preset system data calculation function set to calculate the camera working distance and projector fringe magnification data.

Optionally, the determining the defocus phase undetermined coefficients based on each binary fringe modulation includes:

calculating a defocus degree based on each binary fringe modulation;

calculating the defocus phase undetermined coefficients using the defocus degree and each reference plane phase value based on a least squares principle method.

Optionally, the determining the target inter-optical-center horizontal distance using the preset system pose optimization mathematical model based on the initial inter-optical-center horizontal distance, the system distance magnification data, and the defocus phase undetermined coefficients includes:

performing partial derivation on the preset system pose optimization mathematical model to determine a system pose optimization mathematical partial-derivative loss function;

substituting the initial inter-optical-center horizontal distance, the camera working distance, the projector fringe magnification data, and projector display chip distance data from the defocus phase undetermined coefficients into the system pose optimization mathematical partial-derivative loss function to calculate an inter-optical-center horizontal distance gradient loss value;

determining whether the inter-optical-center horizontal distance gradient loss value converges;

if the inter-optical-center horizontal distance gradient loss value converges, using the initial inter-optical-center horizontal distance as the target inter-optical-center horizontal distance.

Optionally, the method further includes:

if the inter-optical-center horizontal distance gradient loss value does not converge, optimizing the initial inter-optical-center horizontal distance using a gradient descent method and the inter-optical-center horizontal distance gradient loss value to obtain an intermediate inter-optical-center horizontal distance;

substituting the intermediate inter-optical-center horizontal distance, the camera working distance, the projector fringe magnification data, and the projector display chip distance data from the defocus phase undetermined coefficients into the system pose optimization mathematical partial-derivative loss function to calculate the inter-optical-center horizontal distance gradient loss value, until the inter-optical-center horizontal distance gradient loss value converges;

using the intermediate inter-optical-center horizontal distance determined at convergence as the target inter-optical-center horizontal distance.

Optionally, the preset system pose optimization mathematical model is specifically as follows:

4

$$
h_R =
\frac{L}{\sqrt{L^2 + B^2}} \; \frac{3S^2 TH}{\pi} \left( \sqrt{\ln\!\left(4E^2 Na_2^2 E_{h1}\sqrt{L^2 + B^2}\,B\right) - \ln\!\left(V\pi\sigma_n^2(L - E_{h1})\right)} - \right.
$$

$$
\left. \sqrt{\frac{\ln\!\left(4E_{h2}\pi(M^2-1)^2\sqrt{L^2+B^2}\,B\right) - \ln\!\left(4M^2 V(L - E_{h2})\right)}{2M - M^2}} \right) - \frac{Fox_y B}{L};
$$

where $h_R$ is a system pose optimization value; L is a camera working distance; B is an initial inter-optical-center horizontal distance; S is a focal plane distance; T is a fringe period; H is projector display chip distance data;

$$
H = \frac{r}{UD};
$$

r is a distance between adjacent micromirrors in the projector display chip; U is an object distance between the projector display chip and a lens; D is a aperture diameter; E is a maximum gray value of preset binary fringe patterns; N is a number of the preset binary fringe patterns; $a_2$ is harmonic signal response intensity; $E_{h1}$ is a preset first height error; V is projector fringe magnification data, V=kP, k is a magnification of projected fringe patterns, P is a fringe spacing on a projection target surface; $\sigma_n$ is a random noise variance; $E_{h2}$ is a preset second height error; M is a least common multiple of the number of preset binary fringe patterns and 2; $Fox_y$ is a long-side distance of a camera field of view in a longitudinal direction on a reference plane.

A second aspect of the present application provides a three-dimensional measurement apparatus for a structured light system based on system pose optimization. The structured light system includes a projector and a camera. The apparatus comprises:

an acquisition module configured to acquire multiple binary fringe modulations and perform intrinsic and extrinsic parameter calibration of the projector and the camera using a preset visual positioning method to determine an initial inter-optical-center horizontal distance;

a calculation module configured to capture, by the camera, sinusoidal fringe images projected by the projector onto multiple preset standard blocks, and calculate system distance magnification data based on each sinusoidal fringe image and the initial inter-optical-center horizontal distance;

a determination module configured to determine defocus phase undetermined coefficients based on each binary fringe modulation;

an application module configured to apply a preset system pose optimization mathematical model to determine a target inter-optical-center horizontal distance based on the initial inter-optical-center horizontal distance, the system distance magnification data, and the defocus phase undetermined coefficients;

an adjustment module configured to adjust the system pose of the structured light system based on the target inter-optical-center horizontal distance, and construct a three-dimensional model of an object to be measured based on a triangulation method.

A third aspect of the present application provides a non-transitory_computer-readable storage medium storing a computer program/instruction. When the computer program/ instruction is executed by a processor, steps of the three-dimensional measurement method for the structured light system based on system pose optimization according to any one of the above aspects are implemented.

A fourth aspect of the present application provides a computer program product including a computer program/instruction. When the computer program/instruction is executed by a processor, steps f the three-dimensional measurement method for the structured light system based on system pose optimization according to any one of the above aspects are implemented.

From the above technical solutions, the present application has the following advantages:

The above technical solutions of the present application provide a three-dimensional measurement method for a structured light system based on system pose optimization. First, multiple binary fringe modulations are acquired, and intrinsic and extrinsic parameter calibration of the projector and camera are performed using a preset visual positioning method to determine an initial inter-optical-center horizontal distance. Then, sinusoidal fringe images projected by the projector onto multiple preset standard blocks are captured by the camera, and system distance magnification data is calculated based on each sinusoidal fringe image and the initial inter-optical-center horizontal distance. Defocus phase undetermined coefficients are determined based on each binary fringe modulation. A target inter-optical-center horizontal distance is determined by applying a preset system pose optimization mathematical model based on the initial inter-optical-center horizontal distance, the system distance magnification data, and the defocus phase undetermined coefficients. Finally, the system pose of the structured light system is adjusted using the target inter-optical-center horizontal distance, and a three-dimensional model of the object to be measured is constructed based on the triangulation method. Based on the above solution, in the process of constructing the three-dimensional model of the object to be measured based on the target inter-optical-center horizontal distance determined by the preset system pose optimization mathematical model and in combination with the triangulation method, the system pose relationship is considered, thereby achieving high-precision three-dimensional measurement.

DESCRIPTION OF THE DRAWINGS

To describe the technical solutions in the embodiments of the present application or in the prior art more clearly, the accompanying drawings required for describing the embodiments or the prior art will be briefly introduced below. Obviously, the accompanying drawings in the following description show merely some embodiments of the present application, and other drawings may be derived by those of ordinary skill in the art from these accompanying drawings without creative efforts.

FIG. 1 is a flowchart of steps of a three-dimensional measurement method for a structured light system based on system pose optimization according to an embodiment of the present application;

FIG. 2 is another flowchart of steps of a three-dimensional measurement method for a structured light system based on system pose optimization according to an embodiment of the present application;

DETAILED DESCRIPTION OF PREFERRED EMBODIMENTS

Figure 3:
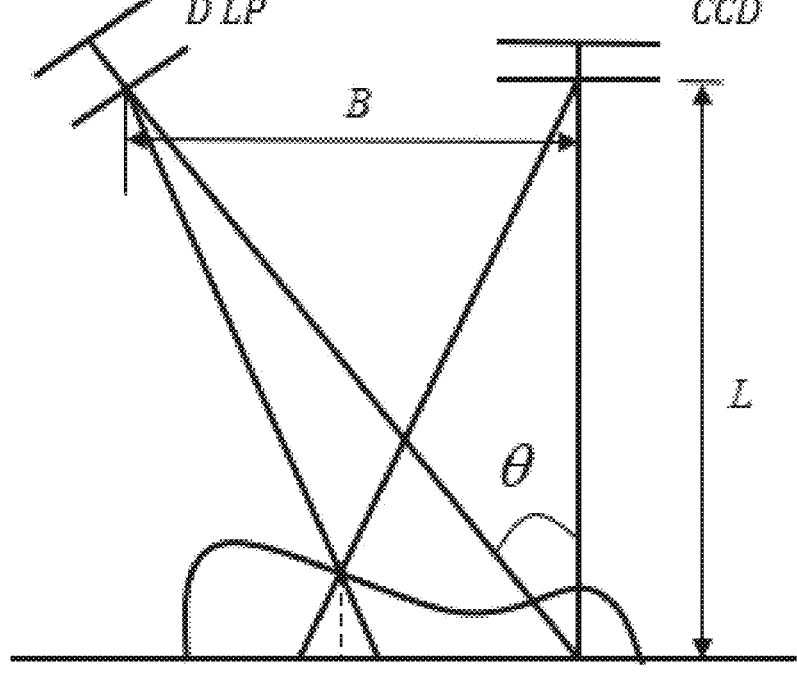
FIG. 3 is a schematic diagram of the phase-height mapping relationship of a projector and camera according to an embodiment of the present application.

Embodiments of the present application provide a three-dimensional measurement method and apparatus for a structured light system based on system pose optimization, which addresses the technical problem in existing structured light three-dimensional measurement methods where it is difficult to adjust the defocus amount of the entire system to an appropriate defocus level, resulting in insufficient measurement accuracy.

To make the objectives, features, and advantages of the present application more apparent and more comprehensible, the technical solutions in the embodiments of the present application will be described clearly and completely with reference to the accompanying drawings. It is obvious that the embodiments described below are merely some, rather than all, of the embodiments of the present application. Based on the embodiments of the present application, all other embodiments obtained by a person of ordinary skill in the art without creative efforts shall fall within the protection scope of the present application.

Please refer to FIG. 1, FIG. 1 is a flowchart of steps of a three-dimensional measurement method for a structured light system based on system pose optimization according to an embodiment of the present application.

A three-dimensional measurement method for a structured light system based on system pose optimization provided by the present application includes steps 101-105.

In step 101, multiple binary fringe modulations are acquired, and intrinsic and extrinsic parameter calibration of a projector and a camera is performed using a preset visual positioning method to determine an initial inter-optical-center horizontal distance.

The preset visual positioning method includes a monocular visual positioning method and a binocular visual positioning method.

The inter-optical-center horizontal distance is a horizontal distance between the camera optical center and the projector optical center.

It should be noted that the structured light system includes a digital light processing (DLP) projector, a charge-coupled device (CCD) camera, and a reference plane. First, the DLP projector and CCD are adjusted to the same height, and the camera optical axis is perpendicular to the reference plane. The intrinsic parameter calibration of the projector and the camera is performed separately using the monocular visual positioning method to determine the intrinsic parameters of the projector and the intrinsic parameters of the camera. Then, a checkerboard calibration board is placed within a common field of view of the projector and camera. The extrinsic parameters of the projector are calibrated based on the intrinsic parameters of the projector and the intrinsic parameters of the camera by the binocular visual positioning method, so as to determine the extrinsic parameters of the projector. The extrinsic parameters of the projector are extrinsic parameters from the projector to the camera, i.e., the rotation matrix R and translation vector T between the projector and camera. From the extrinsic parameters from the projector, the initial relative pose parameters between the projector and camera are obtained, thereby obtaining the initial horizontal distance B between the camera optical center and projector optical center, i.e., the initial inter-optical-center horizontal distance.

In the embodiment, multiple binary fringe modulations are acquired, and the intrinsic and extrinsic parameter calibration of the projector and camera is performed using a preset visual positioning method to determine an initial inter-optical-center horizontal distance.

In step 102, sinusoidal fringe images projected by the projector onto multiple preset standard blocks are captured by the camera, and system distance magnification data is calculated based on each sinusoidal fringe image and the initial inter-optical-center horizontal distance.

The system distance magnification data includes a camera working distance and projector fringe magnification data. The camera working distance is a distance from an origin of the camera coordinate system to the reference plane. The projector fringe magnification data is a product of the fringe spacing on the DLP projector target surface and the magnification of the projected fringe pattern.

The multiple preset standard blocks are standard blocks of different heights placed on the reference plane.

It should be noted that after calibrating the intrinsic and extrinsic parameters of both the projector and camera using the preset visual positioning method, sinusoidal fringe images projected by the projector projected onto the multiple preset standard blocks are captured by the camera. The phase of each sinusoidal fringe image is demodulated by an N-step phase-shifting method, so as to generate a wrapped phase corresponding to each sinusoidal fringe image. Each wrapped phase is normalized by a multi-frequency heterodyne method, so as to output an absolute phase map. In the absolute phase map, each preset standard block phase value and its corresponding reference plane phase value are selected. Difference operations are performed between each standard block phase value and its corresponding reference plane value to output multiple phase difference values. The initial inter-optical-center horizontal distance, each phase difference value, and a height of each preset standard block are substituted into a preset system data calculation function group to calculate the camera working distance and the projector fringe magnification data. The calculating the wrapped phase by the N-step phase-shifting method and the determining the absolute phase map by the multi-frequency heterodyne method may be referred to the calculating of the existing techniques, which are not specifically limited here.

Further, the preset system data calculation function group is specifically as follows:

$$
\begin{cases}
\begin{bmatrix} a \\ b \end{bmatrix} = \left(AA^T\right)^{-1} A^T F \\[2mm]
A = \begin{bmatrix} 1 & 1/\Delta\phi_1 \\ \vdots & \vdots \\ 1 & 1/\Delta\phi_k \end{bmatrix} \\[4mm]
F = \begin{bmatrix} 1/h_1 \\ \vdots \\ 1/h_k \end{bmatrix} \\[4mm]
a = \dfrac{1}{L} \\[2mm]
b = \dfrac{2\pi B\sqrt{L^2 + B^2}}{VL}
\end{cases} ;
$$

where a is a first coefficient of a phase-height mapping function; b is a second coefficient of the phase-height mapping function; A is a phase difference matrix; F is a height matrix; T denotes a transpose operation; $\Delta\phi_1$ is a first phase difference value, i. e., a difference between a standard block phase value and a reference plane phase value at a height of a first preset standard block; $\Delta\phi_k$ is a k-th phase difference value; $h_1$ is the height of the first preset standard block; $h_k$ is a height of the k-th preset standard block; L is the camera working distance; B is the initial inter-optical-center horizontal distance; V is the projector fringe magnification data; V=kP, k is the magnification of the projected fringe pattern; and P is the fringe spacing on the projection target surface.

In the embodiment, sinusoidal fringe images projected by the projector projected onto the multiple preset standard blocks are captured by the camera, and system distance magnification data is calculated based on each sinusoidal fringe image and the initial inter-optical-center horizontal distance.

In step 103, defocus phase undetermined coefficients are determined based on each binary fringe modulation.

The multiple binary fringe modulations are modulations of binary fringes with different fringe widths, which may be obtained by modulation calculation formulas of existing techniques. The present application is not limited to this.

The defocus phase undetermined coefficients include a first defocus phase function undetermined coefficient, a second defocus phase function undetermined coefficient, and projector display chip distance data. The projector display chip distance data His a quotient of a distance r between adjacent micromirrors in the projector display chip divided by a product of a object distance U between the projector display chip and a lens and an aperture diameter D, i. e., $$
H = \frac{r}{UD}.
$$

It should be noted that the defocus degree is first calculated based on the modulations of binary fringes with different widths. Each reference plane phase value is taken as the corresponding normalized reference phase. Then, based on the principle of least squares, the defocus-phase undetermined coefficients are calculated based on the defocus degree and the reference plane phase values by using the least squares principle.

Further, the calculation for the defocus phase undetermined coefficients is specifically as follows:

$$\phi = \frac{K\left(\frac{1}{6S^2 H}\right)}{\sigma_d + \frac{1}{6SH}} + G;$$

where $\phi$ is a reference plane phase value; K is the first defocus phase function undetermined coefficient; H is the projector display chip distance data $$H = \frac{r}{UD},$$

r is the distnace between adjacent micromirrors (DMD micromirror) in the projector display chip; V is the object distance between the projector display chip and the lens; D is the aperture diameter; S is a focal plane distance; $\sigma_d$ is the defocus degree; G is the second defocus phase function undetermined coefficient.

In the embodiment, defocus phase undetermined coefficients are determined based on each binary fringe modulation.

In step 104, a preset system pose optimization mathematical model is applied to determine a target inter-optical-center horizontal distance based on the initial inter-optical-center horizontal distance, the system distance magnification data, and the defocus phase undetermined coefficients.

It should be noted that first, the preset system pose optimization mathematical model is first differentiated to determine the system pose optimization mathematical partial-derivative loss function. Finally, the initial inter-optical-center horizontal distance, the camera working distance, the projector fringe magnification data, and the projector display chip distance data from the defocus phase undetermined coefficients are substituted into the partial-derivative loss function to calculate a gradient loss value for the inter-optical-center horizontal distance and determine whether the gradient loss value converges. If the gradient loss value converges, it indicates the loss value meets the convergence criterion, and the initial inter-optical-center horizontal distance is taken as the target inter-optical-center horizontal distance.

Further, the preset system pose optimization mathematical model is specifically as follows:

$$h_R =$$

$$\frac{L}{\sqrt{L^2 + B^2}} \frac{3S^2 TH}{\pi} \left( \sqrt{\ln\left(4E^2 Na_2^2 E_{h1} \sqrt{L^2 + B^2}\, B\right) - \ln\left(V\pi\sigma_n^2(L - E_{h1})\right)} - \right.$$

$$\left. \sqrt{\frac{\ln\left(4E_{h2}\pi(M^2 - 1)^2 \sqrt{L^2 + B^2}\, B\right) - \ln\left(4M^2 V(L - E_{h2})\right)}{2M - M^2}} \right) - \frac{Fox_y B}{L};$$

where $h_R$ is a system pose optimization value; L is a camera working distance; B is an initial inter-optical-center horizontal distance; S is a focal plane distance; T is a fringe period; H is projector display chip distance data;

$$H = \frac{r}{UD};$$

r is a distance between adjacent micromirrors in the projector display chip; U is an object distance between the projector display chip and the lens; D is an aperture diameter; E is a maximum gray value of preset binary fringe patterns; N is a number of the preset binary fringe patterns; $a_2$ is harmonic signal response intensity; $E_{h1}$ is a preset first height error; V is projector fringe magnification data, V=kP, k is magnification of projected fringe patterns, P is a fringe spacing on a projection target surface; $\sigma_n$ is a random noise variance; $E_{h2}$ is a preset second height error; M is a least common multiple of the number of preset binary fringe patterns and 2; $Fox_y$ is a long-side distance of a camera field of view in a longitudinal direction on a reference plane.

In the embodiment, the preset system pose optimization mathematical model is applied to determine a target inter-optical-center horizontal distance based on the initial inter-optical-center horizontal distance, the system distance magnification data, and the defocus phase undetermined coefficients.

In step 105, the system pose of the structured light system is adjusted based on the target inter-optical-center horizontal distance, and a three-dimensional model of the object to be measured is constructed based on the triangulation method.

It should be noted that after adjusting the system pose of the structured light system based on the target inter-optical-center horizontal distance, the adjusted structured light system is configured to reconstruct the three-dimensional point cloud of the object to be measured based on the triangulation method, thereby constructing the three-dimensional model of the object to be measured and completing three-dimensional measurement of the object to be measured.

In this embodiment, the system pose of the structured light system is adjusted based on the target inter-optical-center horizontal distance, and a three-dimensional model of the object to be measured is constructed based on the triangulation method.

In the embodiment of the present application, the three-dimensional measurement method for the structured light system based on system pose optimization is provided. First, multiple binary fringe modulations are acquired, and intrinsic and extrinsic parameter calibration of the projector and camera are performed using a preset visual positioning method to determine an initial inter-optical-center horizontal distance. Then, sinusoidal fringe images projected by the projector onto multiple preset standard blocks are captured by the camera, and system distance magnification data is calculated based on each sinusoidal fringe image and the initial inter-optical-center horizontal distance. Defocus phase undetermined coefficients are determined based on each binary fringe modulation. A target inter-optical-center horizontal distance is determined by applying a preset system pose optimization mathematical model based on the initial inter-optical-center horizontal distance, the system distance magnification data, and the defocus phase undetermined coefficients. Finally, the system pose of the structured light system is adjusted using the target inter-optical-center horizontal distance, and a three-dimensional model of the object to be measured is constructed based on the triangulation method. Based on the above solution, in the process of constructing the three-dimensional model of the object to be measured based on the target inter-optical-center horizontal distance determined by the preset system pose optimization mathematical model and in combination with the triangulation method, the system pose relationship is considered, thereby achieving high-precision three-dimensional measurement.

Referring to FIG. 2, FIG. 2 is a flowchart of steps of another three-dimensional measurement method for a structured light system based on system pose optimization according to an embodiment of the present application.

The three-dimensional measurement method for the structured light system based on system pose optimization provided by the present application includes steps 201-205.

In step 201, multiple binary fringe modulations are acquired, and intrinsic and extrinsic parameter calibration of a projector and a camera is performed separately by a preset visual positioning method to determine an initial inter-optical-center horizontal distance.

The preset visual positioning method includes a monocular visual positioning method and a binocular visual positioning method.

Further, step 201 can include the following sub-steps S11-S13.

In S11, intrinsic parameter calibration of the projector and the camera is performed separately by using the monocular visual positioning method to determine intrinsic parameters of the projector and intrinsic parameters of the camera;

In S12, extrinsic parameter calibration of the projector is performed based on the intrinsic parameters of the projector and the intrinsic parameters of the camera by using the binocular visual positioning method.

In S13, an initial inter-optical-center horizontal distance is determined based on the extrinsic parameters of the projector.

In the embodiment, the multiple binary fringe modulations are acquired, and the intrinsic and extrinsic parameter calibration of the projector and camera is performed by using the preset visual positioning method to determine the inter-optical-center initial horizontal distance.

In step 202, sinusoidal fringe images projected by the projector onto multiple preset standard blocks are captured by the camera, and system distance magnification data is calculated based on each sinusoidal fringe image and the initial inter-optical-center horizontal distance.

The system distance magnification data includes a camera working distance and projector fringe magnification data.

Further, step 202 may include the following sub-steps S21-S25.

In S21, phase demodulation is performed on each sinusoidal fringe image by using an N-step phase-shifting method to generate a wrapped phase corresponding to each sinusoidal fringe image.

In S22, each wrapped phase is normalized by using a multi-frequency heterodyne method to output an absolute phase map.

In S23, a standard block phase value of each preset standard block and a reference plane phase value corresponding to each standard block phase value are selected in the absolute phase map.

In S24, difference operations are performed on each standard block phase value and the corresponding reference plane phase value respectively to output multiple phase differences.

In S25, the initial inter-optical-center horizontal distance, each phase difference, and a height of each preset standard block are substituted into a preset system data calculation function group to calculate the camera working distance and projector fringe magnification data.

It should be noted that, as shown in FIG. 3, the known phase-height mapping model obtained by using the current three-dimensional measurement system (structured light system) is specifically as follows:

$$h = \frac{\Delta\phi P_0 L}{2\pi B + \Delta\phi P_0};$$

where h is a height of the object to be measured; $\Delta\phi$ is a difference between the standard block phase value and the reference plane phase value; $P_0$ is a fringe spacing on the reference plane; L is the camera working distance, i. e., a distance from an origin of a camera coordinate system to the reference plane; B is the initial inter-optical-center horizontal distance, i. e., a horizontal distance between the camera optical center and the projector optical center.

Figure 4:
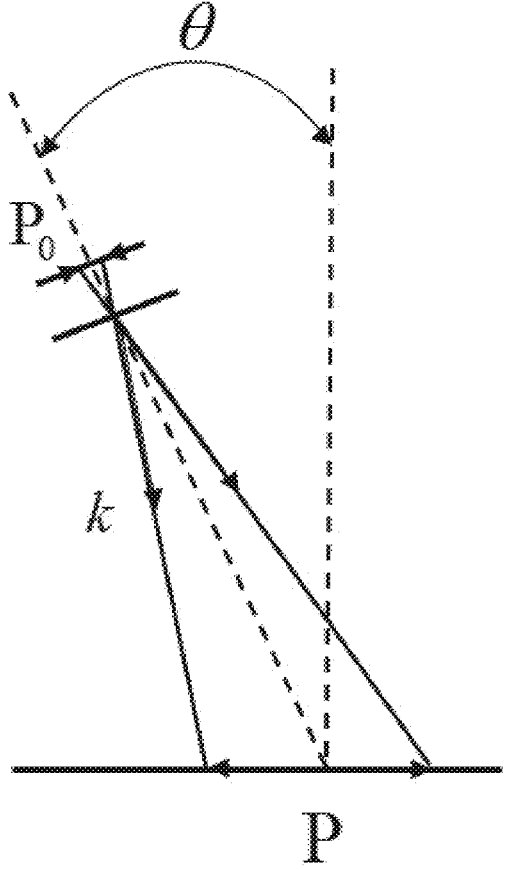
FIG. 4 is a schematic diagram of a fringe spacing relationship of a projector according to an embodiment of the present application.

Further, as shown in FIG. 4, the relationship between the fringe spacing on the DLP chip and the reference plane fringe spacing is analyzed geometrically, and is specifically as follows:

$$P_0 = kP\cos\theta;$$

where $P_0$ is the fringe spacing on the reference plane; k is the magnification of the projected fringe pattern; P is the fringe spacing on the projection target surface; $\theta$ is an angle between the projector optical axis and the camera optical axis.

Based on the above, the phase-height mapping function is further derived as follows:

$$\frac{1}{h} = \frac{1}{L} + \frac{2\pi B\sqrt{L^2 + B^2}}{pkL}\frac{1}{\Delta\phi};$$

where h is the height of the object to be measured; $\Delta\phi$ is a phase; k is the magnification of the projected fringe pattern; P is the fringe spacing on the projection target surface; L is the camera working distance, i. e., a distance from an origin of a camera coordinate system to the reference plane; and B is the initial inter-optical-center horizontal distance, i. e., a horizontal distance between the camera optical center and the projector optical center.

Further, multiple preset standard blocks of known heights, i. e., multiple preset standard blocks, are placed on the reference plane. N fringe patterns are captured by the camera. The wrapped phase is obtained by using the N-step phase-shifting method, and the absolute phase is obtained by the multi-frequency heterodyne method. Then, the phase value on the preset standard block and the phase value on the reference plane may be captured to construct the phase-height mapping model is constructed in a specific matrix form. Specifically, sinusoidal fringe images projected by the projector onto the multiple preset standard blocks are captured by the camera. Phase demodulation is performed on each sinusoidal fringe image by using the N-step phase-shifting method, so as to generate a wrapped phase corresponding to each sinusoidal fringe image. Each wrapped phase is normalized by using the multi-frequency heterodyne method to output an absolute phase map. In the absolute phase map, the standard block phase value of each preset standard block and the reference plane phase value corresponding to each standard block phase value are selected. Difference operations are performed between each standard block phase value and its corresponding reference plane phase value respectively to output multiple phase difference values. The initial inter-optical-center horizontal distance, each phase difference value, and the standard block height of each preset standard block are substituted tinto the preset system data calculation function group to calculate the camera working distance and projector fringe magnification data. The process of calculating the wrapped phase based on the N-step phase-shifting method and determining the absolute phase map based on the multi-frequency heterodyne method may be referred to the calculation processes in existing techniques, which are not specifically limited here.

Further, the specific matrix form of the phase-height mapping model is as follows:

$$\begin{bmatrix} 1 & 1/\Delta\phi_1 \\ \vdots & \vdots \\ 1 & 1/\Delta\phi_k \end{bmatrix} \times \begin{bmatrix} a \\ b \end{bmatrix} = \begin{bmatrix} 1/h_1 \\ \vdots \\ 1/h_k \end{bmatrix};$$

where a is a first coefficient of the phase-height mapping function; b is a second coefficient of the phase-height mapping function; A is the phase difference matrix; $\Delta\phi_1$ is a first phase difference value, i. e., a difference between the standard block phase value and the reference plane phase value at the height of the first preset standard block; $\Delta\phi_k$ is a k-th phase difference value; $h_1$ is a height of the first preset standard block; $h_k$ is a height of the k-th preset standard block; k is the total number of the preset standard blocks.

Further, the coefficients of the phase-height mapping function are solved by using the least squares method, and the specific solution formula is as follows:

$$\begin{bmatrix} a \\ b \end{bmatrix} = (AA^T)^{-1}A^TF;$$

where a is the first coefficient of the phase-height mapping function; b is the second coefficient of the phase-height mapping function; A is the phase difference matrix; F is a height matrix; and T denotes the transpose operation.

Further, based on the above formulas, the preset system data calculation function group is obtained, thereby obtaining the camera working distance L. The fringe spacing $P_0$ of the reference plane is obtained based on the calibrated coefficients and the initial inter-optical-center horizontal distance B. The preset system data calculation function group are as follows:

$$\begin{cases} \begin{bmatrix} a \\ b \end{bmatrix} = (AA^T)^{-1}A^TF \\ A = \begin{bmatrix} 1 & 1/\Delta\phi_1 \\ \vdots & \vdots \\ 1 & 1/\Delta\phi_k \end{bmatrix} \\ F = \begin{bmatrix} 1/h_1 \\ \vdots \\ 1/h_k \end{bmatrix} \\ a = \dfrac{1}{L} \\ b = \dfrac{2\pi B\sqrt{L^2 + B^2}}{VL} \end{cases};$$

where a is the first coefficient of the phase-height mapping function; b is the second coefficient of the phase-height mapping function; A is the phase difference matrix; F is the height matrix; and T denotes the transpose operation; $\Delta\phi_1$ is a first phase difference value, i. e., a difference between the standard block phase value and the reference plane phase value at the height of the first preset standard block; $\Delta\phi_k$ is a k-th phase difference value; $h_1$ is the height of the first preset standard block; $h_k$ is the height of the k-th preset standard block; L is the camera working distance; B is the initial inter-optical-center horizontal distance; V is the projector fringe magnification data, V=kP; k is the magnification of the projected fringe pattern; and P is the fringe spacing on the projection target surface.

In the embodiment, sinusoidal fringe images projected by the projector projected onto multiple preset standard blocks are captured by the camera, and system distance magnification data is calculated based on each sinusoidal fringe image and the initial inter-optical-center horizontal distance.

In step 203, the defocus degree is calculated based on each binary fringe modulation.

In the embodiment, the defocus degree is calculated based on each binary fringe modulation.

In step 204, the defocus phase undetermined coefficients are calculated based on the defocus degree and each reference plane phase value by using the least squares principle method.

The defocus phase undetermined coefficients includes a first defocus phase function undetermined coefficient, a second defocus phase function undetermined coefficient, and projector display chip distance data. The projector display chip distance data H is a quotient of a distance r between adjacent micromirrors in the projector display chip divided by a product of an object distance U between the projector display chip and a lens and an aperture diameter D, i.e., $$H = \frac{r}{UD}.$$

It should be noted that, for the reference plane as the measurement object, the reference plane is placed on one side of the focal plane, and the height of this plane relative to the projector is continuously adjusted. During this process, the defocus degree is calculated based on the modulations of binary fringes with different widths. Then, the corresponding reference plane phase values calculated based on the above N-step phase-shifting method are taken as normalized reference phases, and the defocus degrees and the normalized reference phases at different heights are obtained. The undetermined coefficients of the defocus phase function are obtained by using the least squares principle. The focal plane distance S may be obtained through actual measurement.

Further, the calculation for the defocus phase undetermined coefficients is specifically as follows:

$$\phi = \frac{K\left(\dfrac{1}{6S^2H}\right)}{\sigma_d + \dfrac{1}{6SH}} + G;$$

where $\phi$ is the reference plane phase value; K is the first undetermined coefficient of the defocus phase function; H is the projector display chip distance data; r is the distance between adjacent micromirrors in the projector display chip; U is the object distance between the projector display chip and the lens; D is the aperture diameter; S is the focal plane distance; $\sigma_d$ is the defocus degree; and G is the second undetermined coefficient of the defocus phase function.

In the embodiment, the defocus phase undetermined coefficients are calculated based on the defocus degree and each reference plane phase value by using the least squares principle method.

In step 205, the preset system pose optimization mathematical model is applied to determine the target inter-optical-center horizontal based on the initial inter-optical-center horizontal distance, the system distance magnification data, and the defocus phase undetermined coefficients.

Further, the step 205 may include the following sub-steps S51-S54.

In S51, partial derivation is performed on the preset system pose optimization mathematical model to determine a system pose optimization mathematical partial-derivative loss function.

In S52, the initial inter-optical-center horizontal distance, the camera working distance, the projector fringe magnification data, and the projector display chip distance data from the defocus phase undetermined coefficients are substituted into the system pose optimization mathematical partial-derivative loss function to calculate the gradient loss value of the inter-optical-center horizontal distance.

In S53, whether the gradient loss value of the inter-optical-center horizontal distance converges is determined.

In S54, take the initial inter-optical-center horizontal distance is taken as the target inter-optical-center horizontal distance when the gradient loss value of the inter-optical-center horizontal distance converges.

Optionally, when the gradient loss value of the inter-optical-center horizontal distance does not converge, the initial inter-optical-center horizontal distance is optimized based on the gradient loss value of the inter-optical-center horizontal distance by using the gradient descent method, so as to obtain an intermediate inter-optical-center horizontal distance.

The intermediate inter-optical-center horizontal distance, the camera working distance, the projector fringe magnification data, and the projector display chip distance data from the defocus phase undetermined coefficients are substituted into the system pose optimization mathematical partial-derivative loss function to calculate the gradient loss value of the inter-optical-center horizontal distance, until the gradient loss value of the inter-optical-center horizontal distance converges.

The intermediate inter-optical-center horizontal distance determined when the gradient loss value of the inter-optical-center horizontal distance converges is taken as the target inter-optical-center horizontal distance.

It should be noted that based on the above formula of the phase-height mapping function, the phase error mapping model is derived, and the phase-height mapping error model is further derived. The phase error mapping model is specifically as follows:

$$\Delta\phi = \frac{2\pi Bh\sqrt{L^2 + B^2}}{Pk(L - h)};$$

where h is the height of the object to be measured; $\Delta\phi$ is the phase; k is the magnification of the projected fringe pattern; P is the fringe spacing on the projection target surface; L is the camera working distance, i. e., the distance from the origin of the camera coordinate system to the reference plane; B is the initial inter-optical-center horizontal distance, i. e., the horizontal distance between the camera optical center and projector optical center.

Further, the phase-height mapping error model is specifically as follows:

$$E_\phi = \frac{2\pi BE_h\sqrt{L^2 + B^2}}{Pk(L - E_h)};$$

where $E_\phi$ is a phase error of the reconstruction model; $E_h$ is a height error of the reconstruction model; k is the magnification of the projected fringe pattern; P is the fringe spacing on the projection target surface; L is the camera working distance, i.e., the distance from the origin of the camera coordinate system to the reference plane; B is the initial inter-optical-center horizontal distance, i.e., the horizontal distance between the camera optical center and projector optical center.

Further, the preset first height error $E_{h1}$ and preset second height error $E_{h2}$, i. e., the height errors corresponding to the upper and lower limits of the effective defocus distance $h_d$, are set by using the phase-height mapping error model. A formula for a phase mean squared error model based on binary defocus measurement theory is as follows:

$$\sigma_\phi^2 = \left\{\frac{-\pi\sigma_n}{dEa_2\sqrt{2N}}\right\}^2 + \frac{1}{2}\left\{\frac{d^{(M-1)^2-1}}{M-1} + \frac{d^{(M-1)^2-1}}{M+1}\right\}^2$$

where $\sigma_\phi$ is a predicted phase error of the sinusoidal fringe; d is the fundamental frequency amplitude attenuation coefficient of the binary fringe pattern; E is the maximum gray value of the preset binary fringe pattern; N is the number of the preset binary fringe patterns; $a_2$ is the harmonic signal response intensity; $\sigma_n$ is the random noise variance; and M is the least common multiple of the number of the preset binary fringe patterns and 2.

Further, the phase error $E_\phi$ of the phase error mapping model is evaluated by using the above phase mean squared error model, i. e., the phase-height mapping error model. Based on the phase error model in binary defocus measurement theory, which categorizes into over-defocus and under-defocus scenarios as constraints, and combined with the phase mean squared error distribution characteristics, the preset first height error ($E_{h1}$) and second height error ($E_{h2}$) are respectively integrated with the phase mean squared error model to derive the following formula:

$$E_{\phi 1} = \sigma_{\phi 1}^2 = \left\{\frac{-\pi\sigma_n}{d_1 Ea_2\sqrt{2N}}\right\}^2$$

$$E_{\phi 2} = \sigma_{\phi 2}^2 = \frac{1}{2}\left\{\frac{d_2^{(M-1)^2-1}}{M-1} + \frac{d_2^{(M+1)^2-1}}{M+1}\right\}^2$$

where $E_{\phi 1}$ is a first phase error corresponding to the preset first height error; $E_{\phi 2}$ is the second phase error corresponding to the preset second height error; $d_1$ is the first modulation attenuation coefficient; $d_2$ is the second modulation attenuation coefficient; $\sigma_{\phi 1}$ is the predicted first phase error of the sinusoidal fringe; $\sigma_{\phi 2}$ is the predicted second phase error of the sinusoidal fringe; E is the maximum gray value of the preset binary fringe pattern; N is the number of the preset binary fringe patterns; $a_2$ is the harmonic signal response intensity; $\sigma_n$ is the random noise variance; and M is the least common multiple of the number of preset binary fringe patterns and 2;

Further, the calculation formulas for the defocus degree in the modulation attenuation coefficient and the physical coordinate system are respectively as follows:

$$d = e^{\frac{-2\pi^2 \sigma_d^2}{T^2}}$$

$$\sigma_h = \frac{rS\sigma_d}{U}$$

where d is the modulation attenuation coefficient; T is the fringe period; r is the distance between adjacent micromirrors in the projector display chip; U is the object distance between the projector display chip and the lens; $\sigma_h$ is the defocus degree in the physical coordinate system; $\sigma_d$ is the defocus degree.

Based on the above, $d_1$ and $d_2$ are obtained by substituting the set preset first height error $E_{h1}$ and preset second height error $E_{h2}$ into the phase mean squared error model respectively. According to the calculation formula for the modulation attenuation coefficient, $\sigma_{d1}$ and $\sigma_{d2}$ are derived respectively. The corresponding defocus degrees in the physical coordinate system $\sigma_{h1}$ and $\sigma_{h2}$ are derived according to the calculation formula for the defocus degree in the physical coordinate system. Next, the upper limit $S_{p1}$ and lower limit $S_{p2}$ of the effective defocus distance are derived by substitute these parameters into the following formula between the defocus degree and the object distance, which is specifically as follows:

$$\begin{cases} S_P = \frac{6S\sigma_h}{D} \pm S \\ S_{p1} = \dfrac{3S^2 Tr\sqrt{\ln\left(4E^2 Na_2^2 E_{h1}\sqrt{L^2 + B^2}\,B\right) - \ln\left(kP\pi\sigma_n^2(L - E_{h1})\right)}}{UD\pi} \\ S_P = \frac{6S\sigma_h}{D} \pm S \\ S_{p2} = \dfrac{3S^2 Tr}{UD\pi}\dfrac{\sqrt{\ln\left(4E_{h2}\pi(M^2 - 1)^2\sqrt{L^2 + B^2}\,B\right) - \ln\left(4M^2 kP(L - E_{h2})\right)}}{2M - M^2} \end{cases};$$

where $S_p$ is the upper and lower limits of the effective defocus distance; $\sigma_h$ is the defocus degree in the physical coordinate system; $S_{p1}$ is the upper limit of the effective defocus distance; $S_{p2}$ is the lower limit of the effective defocus distance; L is the camera working distance; B is the initial inter-optical-center horizontal distance; S is the focal plane distance; T is the fringe period; r is the distance between adjacent micromirrors in the projector display chip; U is the object distance between the projector display chip and the lens; D is the aperture diameter; E is the maximum gray value of the preset binary fringe pattern; N is a number of the binary fringe patterns; $a_2$ is the harmonic signal response intensity; $E_{h1}$ is the preset first height error; k is the magnification of the projected fringe pattern; P is the fringe spacing on the projection target surface; $\sigma_n$ is the random noise variance; $E_{h2}$ is the preset second height error; M is the least common multiple of the number of preset binary fringe patterns and 2; and $Fox_y$ is the long-side distance of the camera field of view in the longitudinal direction on the reference plane.

Figure 5:
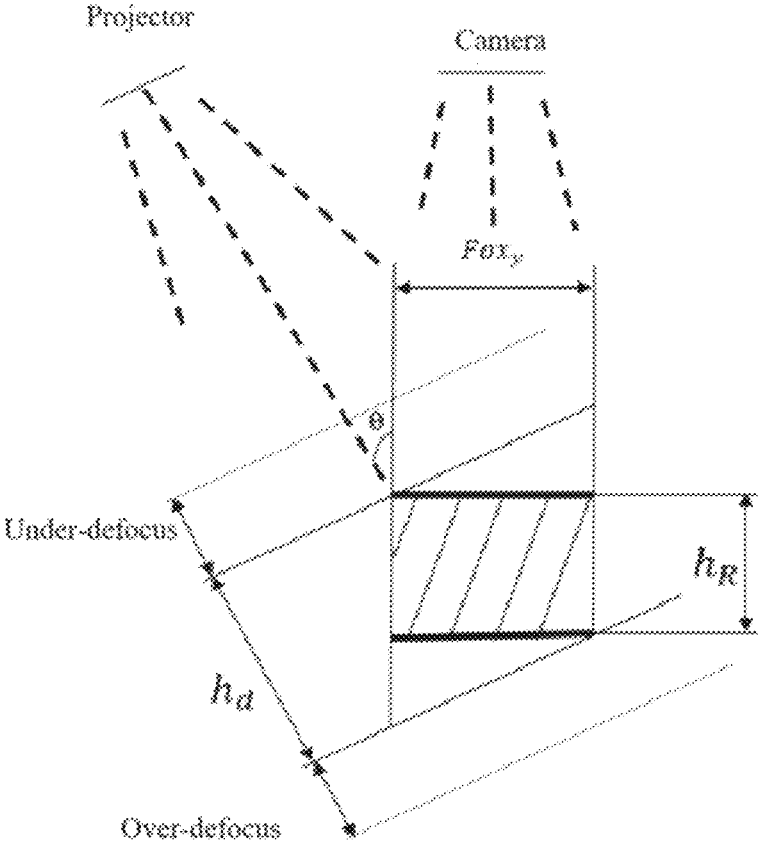
FIG. 5 is a schematic diagram of a spatial geometric relationship of a structured light system according to an embodiment of the present application.

Further, referring to FIG. 5, according to the spatial geometric mathematical relationship established based on the pose of the three dimensional measurement system, the angle between the projector optical axis and camera optical axis being $\theta$, and under the constraints of the effective defocus area $h_d$, the angle between optical axes$\theta$, the maximum working distance (the maximum allowable height value of the object to be measured), the formula is as follows:

$$h_R = h_d\cos\theta - Fox_y\tan\theta;$$

where $h_d$ is the difference between the upper and lower limits of the effective defocus distance; $h_R$ is the system pose optimization value, i. e., a maximum allowable height value of the object to be measured calculated under a given measurement accuracy (the preset first and second height errors); $\theta$ is an angle between optical axes; $Fox_y$ is the long-side distance of the camera field of view in the longitudinal direction y on the reference plane, which may be obtained through actual measurement.

Further, combining the spatial geometric mathematical relationship with the effective defocus distance, a target mathematical model formula for the effective height measurement range (the maximum allowable height value of the object to be measured), i. e., the preset system pose optimization mathematical model is obtained, which is specifically as follows:

$$h_R = \frac{L}{\sqrt{L^2 + B^2}}\frac{3S^2 TH}{\pi}\left(\sqrt{\ln\left(4E^2 Na_2^2 E_{h1}\sqrt{L^2 + B^2}\,B\right) - \ln\left(V\pi\sigma_n^2(L - E_{h1})\right)} - \sqrt{\frac{\ln\left(4E_{h2}\pi(M^2 - 1)^2\sqrt{L^2 + B^2}\,B\right) - \ln\left(4M^2 V(L - E_{h2})\right)}{2M - M^2}}\right) - \frac{Fox_y B}{L};$$

where $h_R$ is a system pose optimization value; L is the camera working distance; B is the initial inter-optical-center horizontal distance; S is the focal plane distance; T is a fringe period; H is projector display chip distance data;

$$H = \frac{r}{UD};$$

r is the distance between adjacent micromirrors in the projector display chip; V is the object distance between the projector display chip and the lens; D is the aperture diameter; E is a maximum gray value of preset binary fringe patterns; N is a number of the preset binary fringe patterns; $a_2$ is harmonic signal response intensity; $E_{h1}$ is a preset first height error; V is the projector fringe magnification data, V=kP, k is the magnification of projected fringe patterns, P is the fringe spacing on a projection target surface; $\sigma_n$ is a random noise variance; $E_{h2}$ is a preset second height error;

M is a least common multiple of the number of preset binary fringe patterns and 2; $Fox_y$ is a long-side distance of a camera field of view in a longitudinal direction on a reference plane.

Based on the above, after determining the preset system pose optimization mathematical model, partial derivation is performed on the preset system pose optimization mathematical model to determine the system pose optimization mathematical partial-derivative loss function. The initial inter-optical-center horizontal distance, the camera working distance, the projector fringe magnification data), and the projector display chip distance data from the defocus phase undetermined coefficients are substituted into the partial-derivative loss function to calculate the gradient loss value of the inter-optical-center horizontal distance.

Further, if the gradient loss value of the inter-optical-center horizontal distance converges, it indicates the loss value meets the convergence criterion, and the initial inter-optical-center horizontal distance is taken as the target inter-optical-center horizontal distance. If the gradient loss value of the inter-optical-center horizontal distance does not converge, the baseline B (the initial inter-optical-center horizontal distance) is optimized by using the gradient descent method. A step size λ is set for the optimization algorithm, and baseline B is iteratively updated until the convergence criterion is met. Specifically, if the gradient loss value of the inter-optical-center horizontal distance does not converge, the initial inter-optical-center horizontal distance is optimized based on the gradient loss value of the inter-optical-center horizontal distance by using the gradient descent method so as to obtain the intermediate inter-optical-center horizontal distance. The intermediate inter-optical-center horizontal distance, the camera working distance, the projector fringe magnification data, and the projector display chip distance data from the defocus phase undetermined coefficients are substituted into the system pose optimization partial-derivative loss function to calculate the gradient loss value of the inter-optical-center horizontal distance, until it converges. The intermediate inter-optical-center horizontal distance determined when the gradient loss value of the inter-optical-center horizontal distance is taken as the target inter-optical-center horizontal distance.

Further, the baseline B (the initial inter-optical-center horizontal distance) is optimized by using the gradient descent method. A step size λ is set for the optimization algorithm, and parameter Bis iteratively updated until the convergence criterion is met. The formula is as follows:

$$B^* = B + \lambda \nabla h(B)$$

where B* is the intermediate inter-optical-center horizontal distance, B is the initial inter-optical-center horizontal distance, λ is the preset algorithm step size, and ∇h(B) is the gradient loss value of the inter-optical-center horizontal distance.

In this embodiment, the preset system pose optimization mathematical model is applied to determine a target inter-optical-center horizontal distance based on the initial inter-optical-center horizontal distance, the system distance magnification data, and the defocus phase undetermined coefficients.

In step 206, the system pose of the structured light system is adjusted based on the inter-optical-center target horizontal distance, and a three-dimensional model of the object to be measured is constructed based on the triangulation method.

It should be noted that use the finally iterated target horizontal distance to adjust the horizontal distance between the projector and camera. Perform 3D reconstruction of the measured object under this system pose. Further, the target inter-optical-center horizontal distance, the camera working distance, the projector fringe magnification data, and the projector display chip distance data from the defocus phase undetermined parameters are substituted into the preset system pose optimization mathematical model to obtain the system pose optimization value $hp_R$, i. e., a maximum allowable height value of the object to be measured.

In the embodiment, the system pose of the structured light system is adjusted based on the target inter-optical-center horizontal distance, and a three-dimensional model of the object to be measured is constructed based on the triangulation method.

Figure 6:
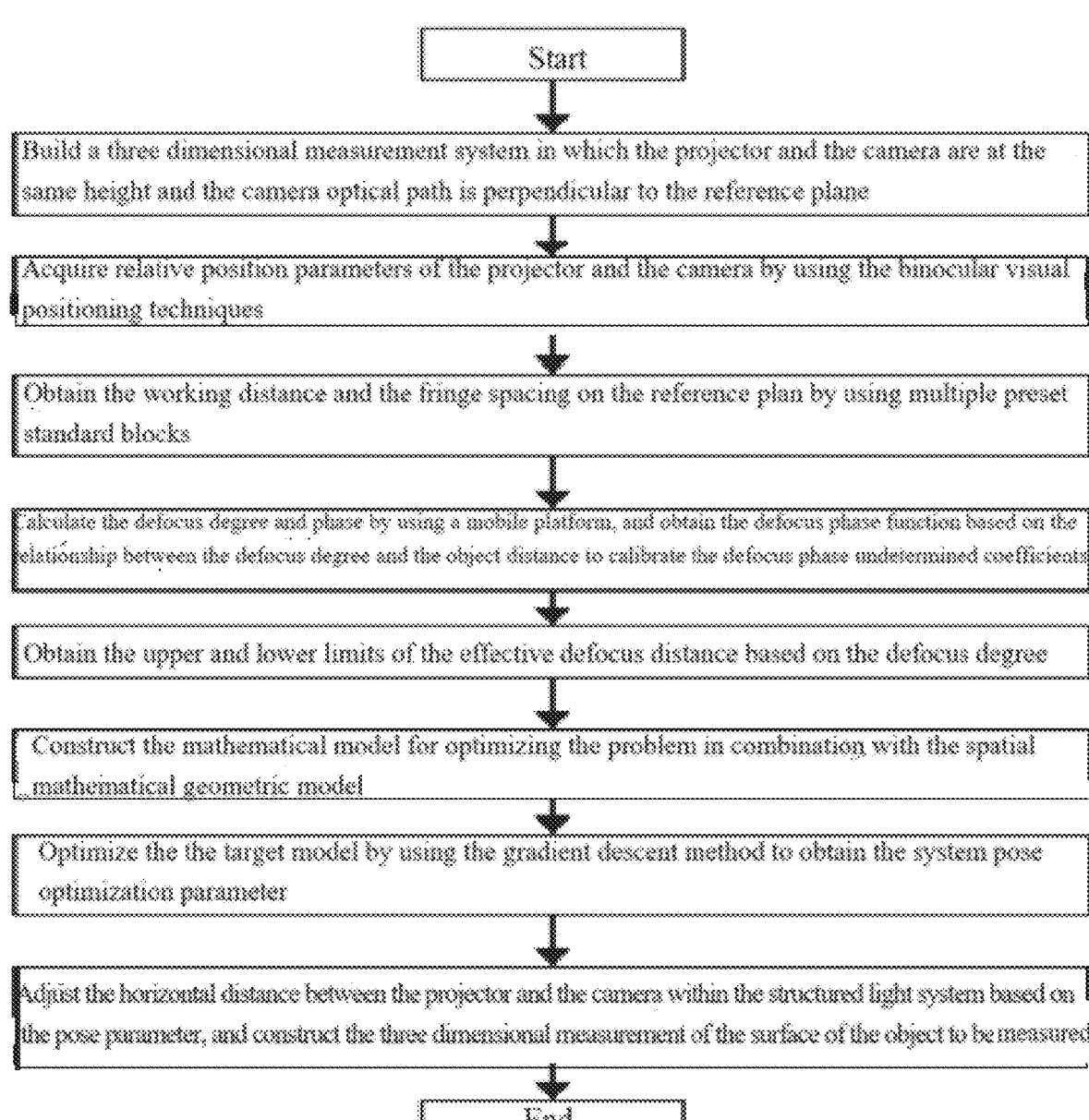
FIG. 6 is a schematic flowchart of a three-dimensional measurement method for a structured light system based on system pose optimization according to an embodiment of the present application.

Exemplarily, referring to FIG. 6, the structured light system, i.e., the three dimensional measurement system, is built, with the projector and camera at the same height and the camera optical path perpendicular to the reference plane. The intrinsic and extrinsic parameter calibration of the projector and camera are performed separately by using monocular and binocular visual positioning methods to determine their relative position parameters and to obtain the initial inter-optical-center horizontal distance. The phase-height model is calibrated by using multiple preset standard blocks to obtain the camera working distance, the fringe spacing on the reference plane, and the projector fringe magnification data, i.e., sinusoidal fringe images projected by the projector onto the preset standard blocks are captured by the camera and the system distance magnification data is calculated based on each sinusoidal fringe image and the initial inter-optical-center horizontal distance. Then, the defocus degree and phase are calculated by using a mobile platform. The defocus phase undetermined coefficients are calculated based on the defocus degree and reference plane phase values, i.e., the defocus phase undetermined coefficients are determined based on each binary fringe modulation. The upper and lower limits of the effective defocus distance is obtained based on the defocus degree. In combination with the spatial mathematical geometric model, the mathematical model for optimizing the problem (the preset system pose optimization mathematical model) is constructed. The target model is optimized by using the gradient descent method to obtain the system pose optimization parameters, i.e., the preset system pose optimization mathematical model is applied to calculate the gradient loss value of the inter-optical-center horizontal distance based on the inter-optical-center horizontal distance, the system distance magnification data, and the defocus phase undetermined coefficients. When the gradient loss of the inter-optical-center horizontal distance converges, the initial inter-optical-center horizontal distance is taken as the target inter-optical-center horizontal distance. The horizontal distance between the projector and the camera within the structured light system is adjusted based on the pose parameter (the target inter-optical-center horizontal distance). Finally, a three dimensional point cloud is reconstructed by the triangulation method to perform the three dimensional measurement of the surface of the object to be measured.

As a comparison of technical effects, reference may be made to existing technology. Structured light defocus measurement technology may effectively avoid system nonlinearity, but differs in many ways from traditional structured light projection techniques. Unlike the traditional projection, the three dimensional measurement error will greatly increase when the system is not within the proper defocus range: (1) extrinsic noise causes significant interference when the defocus degree is too large, 2) binary fringes at different defocus degrees lead to unstable phase errors. In this case, if the angle between the projector optical axis and the reference plane is too small, the non-uniformity of defocus degree in the same working plane increases. When the angle is too large, reconstruction error greatly increases. Therefore, analyzing the pose relationship of the structured light system during defocus measurement is a key research focus.

Based on the above problems, the present application provides a three-dimensional measurement method for the structured light system based on system pose optimization. According to binary defocus measurement theory, a three-dimensional measurement system including a projector, a camera, and a reference plane is first constructed. The projector and camera are placed at the same height with the camera optical path perpendicular to the reference plane. The relative position parameters of the projector and camera are obtained by using binocular vision technology. The phase-height mapping error model of the system are calibrated by using standard blocks. The undetermined coefficients of the defocus phase function are calibrated by using the least squares method. Upper and lower limits for height error precision are set to derive the corresponding defocus degree relationship. An effective defocus distance is obtained based on the relationship between the defocus degree and the object distance. Considering the spatial mathematical geometric model of the three-dimensional measurement system, the mathematical model for optimizing the problem is constructed based on the obtained effective defocus distance. The optimal pose is obtained by using the gradient descent method to adjust the three-dimensional measurement system. Finally, the three-dimensional point cloud is reconstructed based on a triangulation method, thereby constructing the three-dimensional model of the object to be measured, and completing three-dimensional measurement of the object to be measured. Compared to existing defocus measurement techniques, the system pose relationship is considered, enabling high-speed, high-precision three-dimensional measurement with the maximum depth of field within a given measurement accuracy range.

In the embodiment of the present application, the three-dimensional measurement method for the structured light system based on system pose optimization is provided. First, multiple binary fringe modulations are acquired, and intrinsic and extrinsic parameter calibration of the projector and camera are performed using a preset visual positioning method to determine an initial inter-optical-center horizontal distance. Then, sinusoidal fringe images projected by the projector onto multiple preset standard blocks are captured by the camera, and system distance magnification data is calculated based on each sinusoidal fringe image and the initial inter-optical-center horizontal distance. Defocus phase undetermined coefficients are determined based on each binary fringe modulation. A target inter-optical-center horizontal distance is determined by applying a preset system pose optimization mathematical model based on the initial inter-optical-center horizontal distance, the system distance magnification data, and the defocus phase undetermined coefficients. Finally, the system pose of the structured light system is adjusted using the target inter-optical-center horizontal distance, and a three-dimensional model of the object to be measured is constructed based on the triangulation method. Based on the above solution, in the process of constructing the three-dimensional model of the object to be measured based on the target inter-optical-center horizontal distance determined by the preset system pose optimization mathematical model and in combination with the triangulation method the system pose relationship is considered, thereby achieving high-precision three-dimensional measurement.

Figure 7:
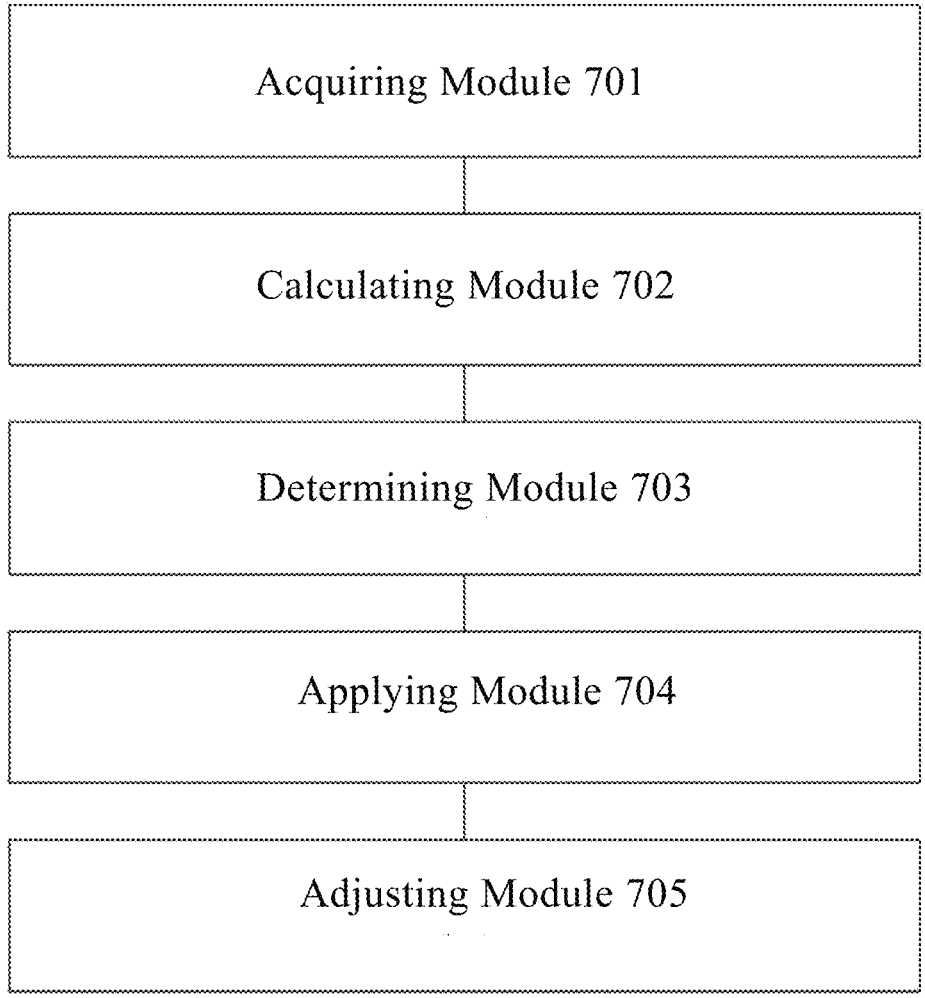
FIG. 7 is a structural block diagram of a three-dimensional measurement apparatus for a structured light system based on system pose optimization according to an embodiment of the present application.

Referring to FIG. 7, FIG. 7 is a structural block diagram of a three-dimensional measurement apparatus for a structured light system based on system pose optimization according to an embodiment of the present application.

The three-dimensional measurement apparatus for the structured light system based on system pose optimization provided by the present application includes:

an acquisition module 701 configured to acquire multiple binary fringe modulations and perform intrinsic and extrinsic parameter calibration of the projector and the camera using a preset visual positioning method to determine an initial inter-optical-center horizontal distance;

a calculation module 702 configured to capture, by the camera, sinusoidal fringe images projected by the projector onto multiple preset standard blocks, and calculate system distance magnification data based on each sinusoidal fringe image and the initial inter-optical-center horizontal distance;

a determination module 703 configured to determine defocus phase undetermined coefficients based on each binary fringe modulation;

an application module 704 configured to apply a preset system pose optimization mathematical model to determine a target inter-optical-center horizontal distance based on the initial inter-optical-center horizontal distance, the system distance magnification data, and the defocus phase undetermined coefficients;

an adjustment module 705 configured to adjust the system pose of the structured light system based on the target inter-optical-center horizontal distance, and construct a three-dimensional model of an object to be measured based on a triangulation method.

Further, the acquisition module 701 includes:

a first submodule, configured to perform intrinsic parameter calibration of the projector and the camera separately by using a monocular visual positioning method to determine intrinsic parameters of the projector and intrinsic parameters of the camera;

a second submodule configured to perform extrinsic parameter calibration of the projector based on the intrinsic parameters of the projector and the intrinsic parameters of the camera by using the binocular visual positioning method;

a third submodule configured to determine an initial inter-optical-center horizontal distance based on the extrinsic parameters of the projector.

Further, the calculation module 702 includes:

a wrapped phase submodule configured to perform phase demodulation on each sinusoidal fringe image by using an N-step phase-shifting method to generate a wrapped phase corresponding to each sinusoidal fringe image;

an absolute phase submodule configured to normalize each wrapped phase by using a multi-frequency heterodyne method to output an absolute phase map;

a phase selection submodule configured to select a standard block phase value of each preset standard block and a reference plane phase value corresponding to each standard block phase value in the absolute phase map;

a difference operation submodule configured to perform difference operations on each standard block phase value and the corresponding reference plane phase value respectively to output multiple phase differences;

a data calculation submodule configured to substitute the initial inter-optical-center horizontal distance, each phase difference, and a height of each preset standard block into a preset system data calculation function group to calculate the camera working distance and projector fringe magnification data.

Further, the determination module 703 includes:

a defocus degree calculation submodule configured to calculate a defocus degree based on each binary fringe modulation;

an undetermined coefficient calculation submodule configured to calculate the defocus phase undetermined coefficients based on the defocus degree and each reference plane phase value by using a least squares principle method.

Further, the application module 704 includes:

a partial derivation submodule configured to perform partial derivation on the preset system pose optimization mathematical model to determine a system pose optimization mathematical partial-derivative loss function;

a loss value calculation submodule configured to substitute the initial inter-optical-center horizontal distance, the camera working distance, the projector fringe magnification data, and the projector display chip distance data from the defocus phase undetermined coefficients into the system pose optimization mathematical partial-derivative loss function to calculate a gradient loss value of the inter-optical-center horizontal distance;

a determination submodule configured to determine whether the gradient loss value of the inter-optical-center horizontal distance converges;

a convergence-determination submodule configured to designate the initial inter-optical-center horizontal distance as the target inter-optical-center horizontal distance when the gradient loss value of the inter-optical-center horizontal distance converges.

Optionally, the apparatus further includes:

a first module configured to optimize the initial inter-optical-center horizontal distance based on the gradient loss value of the initial inter-optical-center horizontal distance by using a gradient descent method to obtain an intermediate inter-optical-center horizontal distance, when the gradient loss value of the inter-optical-center horizontal distance does not converge;

a second module configured to substitute the intermediate inter-optical-center horizontal distance, the camera working distance, the projector fringe magnification data, and the projector display chip distance data from the defocus phase undetermined coefficients into the system pose optimization mathematical partial-derivative loss function to calculate the gradient loss value of the inter-optical-center horizontal distance, until the gradient loss value of the inter-optical-center horizontal distance converges; and a third module configured to designate, as the target inter-optical-center horizontal distance, the intermediate inter-optical-center horizontal distance determined when gradient loss value of the inter-optical-center horizontal distance converges.

Optionally, the preset system pose optimization mathematical model is specifically as follows:

$$
h_R =
$$

$$
\frac{L}{\sqrt{L^2+B^2}} \cdot \frac{3S^2TH}{\pi} \left( \sqrt{\ln\!\left(4E^2Na_2^2E_{h1}\sqrt{L^2+B^2}\,B\right) - \ln\!\left(V\pi\sigma_n^2(L-E_{h1})\right)} - \right.
$$

$$
\left. \sqrt{\frac{\ln\!\left(4E_{h2}\pi(M^2-1)^2\sqrt{L^2+B^2}\,B\right) - \ln\!\left(4M^2V(L-E_{h2})\right)}{2M-M^2}} \right) - \frac{Fox_yB}{L};
$$

where $h_R$ is a system pose optimization value; L is a camera working distance; B is an initial inter-optical-center horizontal distance; S is a focal plane distance; T is a fringe period; H is projector display chip distance data;

$$
H = \frac{r}{UD};
$$

r is a distance between adjacent micromirrors in the projector display chip; U is an object distance between the projector display chip and the lens; D is a aperture diameter; E is a maximum gray value of preset binary fringe patterns; N is a number of the preset binary fringe patterns; $a_2$ is harmonic signal response intensity; $E_{h1}$ is a preset first height error; V is projector fringe magnification data, V=kP, k is magnification of projected fringe patterns, P is a fringe spacing on a projection target surface; $\sigma_n$ is a random noise variance; $E_{h2}$ is a preset second height error; M is a least common multiple of the number of preset binary fringe patterns and 2; $Fox_y$ is a long-side distance of a camera field of view in a longitudinal direction on a reference plane.

Persons skilled in the art may clearly understand that, for the convenience and brevity of description, the specific operating processes of the above-described apparatus, modules, and submodules may be referred to the corresponding steps in the foregoing method embodiments, and are not repeated here.

An embodiment of the present application also provides a computer-readable storage medium having a computer program/instruction stored thereon. When the computer program/instruction is executed by a processor, the steps of the three-dimensional measurement method for the structured light system based on system pose optimization according to any of the foregoing embodiments are implemented.

An embodiment of the present application also provides a computer program product including a computer program/instruction. When the computer program/instruction is executed by a processor, the steps of the three-dimensional measurement method for the structured light system based on system pose optimization according to any of the foregoing embodiments are implemented.

The units described as separate components may or may not be physically separated. Components presented as units may or may not be physical units, that is, may be located in one place, or may be distributed on multiple network units. Some or all of the units may be selected according to actual needs to achieve the objectives of the solutions of the embodiments.

The above description and embodiments are merely intended to illustrate the technical solutions of the present application, and not to limit them. Although the present application has been described in detail with reference to the foregoing embodiments, those of ordinary skill in the art should understand that they may still modify the technical solutions described in the foregoing embodiments, or make equivalent substitutions to some of the technical features. Such modifications or substitutions do not cause the essence of the corresponding technical solutions to depart from the spirit and scope of the technical solutions of the embodiments of the present application.

We claim:

1. A three-dimensional measurement method for a structured light system based on system pose optimization, wherein the structured light system comprises a projector and a camera, and the method comprises:

acquiring a plurality of binary fringe modulations, and performing intrinsic and extrinsic parameter calibration of the projector and the camera by using a preset visual positioning method, to determine an initial inter-optical-center horizontal distance;

capturing, by the camera, sinusoidal fringe images projected by the projector onto a plurality of preset standard blocks, and calculating system distance magnification data based on each sinusoidal fringe image and the initial inter-optical-center horizontal distance;

determining defocus phase undetermined coefficients based on each binary fringe modulation;

applying a preset system pose optimization mathematical model to determine a target inter-optical-center horizontal distance based on the initial inter-optical-center horizontal distance, the system distance magnification data, and the defocus phase undetermined coefficients; and adjusting the system pose of the structured light system based on the target inter-optical-center horizontal distance, and constructing a three-dimensional model of an object to be measured based on a triangulation method;

wherein the determining the defocus phase undetermined coefficients based on each binary fringe modulation comprises:

calculating a defocus degree based on each binary fringe modulation;

calculating the defocus phase undetermined coefficients based on the defocus degree and each reference plane phase value based on a least squares principle method;

wherein the defocus phase undetermined coefficients comprise a first undetermined coefficient of a defocus phase function, a second undetermined coefficient of the defocus phase function, and projector display chip distance data;

wherein the applying the preset system pose optimization mathematical model to determine the target inter-optical-center horizontal distance based on the initial inter-optical-center horizontal distance, the system distance magnification data, and the defocus phase undetermined coefficients comprises:

performing partial derivation on the preset system pose optimization mathematical model to determine a system pose optimization mathematical partial-derivative loss function;

substituting the initial inter-optical-center horizontal distance, a camera working distance, projector fringe magnification data, and the projector display chip distance data from the defocus phase undetermined coefficients into the system pose optimization mathematical partial-derivative loss function to calculate a gradient loss value of the inter-optical-center horizontal distance;

determining whether the gradient loss value of the inter-optical-center horizontal distance converges;

designating the initial inter-optical-center horizontal distance as the target inter-optical-center horizontal distance when the gradient loss value of the inter-optical-center horizontal distance converges;

the preset system pose optimization mathematical model is as follows:

$$h_R = \frac{L}{\sqrt{L^2 + B^2}} \cdot \frac{3S^2 TH}{\pi}\left(\sqrt{\ln\left(4E^2 Na_2^2 E_{h1}\sqrt{L^2 + B^2}\,B\right) - \ln\left(V\pi\sigma_n^2(L - E_{h1})\right)} - \sqrt{\frac{\ln\left(4E_{h2}\pi(M^2 - 1)^2\sqrt{L^2 + B^2}\,B\right) - \ln\left(4M^2 V(L - E_{h2})\right)}{2M - M^2}}\right) - \frac{Fox_y B}{L};$$

where $h_R$ is a system pose optimization value; L is the camera working distance; B is the initial inter-optical-center horizontal distance; S is a focal plane distance; T is a fringe period; H is the projector display chip distance data;

$$H = \frac{r}{UD}; r$$

is a distance between adjacent micromirrors in the projector display chip; U is an object distance between the projector display chip and a lens; D is an aperture diameter; E is a maximum gray value of preset binary fringe patterns; N is a number of the preset binary fringe patterns; $a_2$ is harmonic signal response intensity; $E_{h1}$ is a preset first height error; V is projector fringe magnification data, V=kP, k is magnification of projected fringe patterns, P is a fringe spacing on a projection target surface; $\sigma_n$ is a random noise variance; $E_{h2}$ is a preset second height error; M is a least common multiple of the number of preset binary fringe patterns and 2; $Fox_y$ is a long-side distance of a camera field of view in a longitudinal direction on a reference plane.

2. The method according to claim 1, wherein the preset visual positioning method comprises a monocular visual positioning method and a binocular visual positioning method; the performing the intrinsic and extrinsic parameter calibration of the projector and the camera by using the preset visual positioning method to determine the initial inter-optical-center horizontal distance comprises:

performing intrinsic parameter calibration of the projector and the camera separately by using the monocular visual positioning method to determine intrinsic parameters of the projector and intrinsic parameters of the camera;

performing extrinsic parameter calibration of the projector based on the intrinsic parameters of the projector and the intrinsic parameters of the camera by using the binocular visual positioning method, so as to determine extrinsic parameters of the projector; and determining the initial inter-optical-center horizontal distance based on the extrinsic parameters of the projector.

3. The method according to claim 1, wherein the system distance magnification data comprises a camera working distance and projector fringe magnification data; the calculating the system distance magnification data based on each sinusoidal fringe image and the initial inter-optical-center horizontal distance comprises:

performing phase demodulation on each sinusoidal fringe image by using an N-step phase-shifting method to generate a wrapped phase corresponding to each sinusoidal fringe image;

normalizing each wrapped phase by using a multi-frequency heterodyne method to output an absolute phase map;

selecting a standard block phase value of each preset standard block and a reference plane phase value corresponding to each standard block phase value in the absolute phase map;

performing difference operations on each standard block phase value and the corresponding reference plane phase value respectively to output a plurality of phase differences;

substituting the initial inter-optical-center horizontal distance, each phase difference, and a standard block height of each preset standard block into a preset system data calculation function group to calculate the camera working distance and the projector fringe magnification data.

4. The method according to claim 1, further comprising:

optimizing the initial inter-optical-center horizontal distance based on the gradient loss value of the inter-optical-center horizontal distance by using a gradient descent method to obtain an intermediate inter-optical-center horizontal distance when the gradient loss value of the inter-optical-center horizontal distance does not converge;

substituting the intermediate inter-optical-center horizontal distance, the camera working distance, the projector fringe magnification data, and the projector display chip distance data from the defocus phase undetermined coefficients into the system pose optimization mathematical partial-derivative loss function to calculate the gradient loss value of the inter-optical-center horizontal distance, until the gradient loss value of the inter-optical-center horizontal distance converges;

designating the intermediate inter-optical-center horizontal distance determined when the gradient loss value of the inter-optical-center horizontal distance converges as the target inter-optical-center horizontal distance.

5. A non-transitory computer-readable storage medium having a computer program/instruction stored thereon, wherein when executed by a processor, the computer program/instruction causes the processor to implement steps of the three-dimensional measurement method for the structured light system based on the system pose optimization according to claim 1.

6. A three-dimensional measurement apparatus for a structured light system based on system pose optimization, wherein the structured light system comprises a projector and a camera, and the apparatus comprises:

an acquisition module, configured to acquire a plurality of binary fringe modulations and perform intrinsic and extrinsic parameter calibration of the projector and the camera by using a preset visual positioning method to determine an initial inter-optical-center horizontal distance;

a calculation module, configured to capture a plurality of sinusoidal fringe images projected by the projector onto a plurality of preset standard blocks by the camera, and calculate system distance magnification data based on each sinusoidal fringe image and the initial inter-optical-center horizontal distance;

a determination module, configured to determine defocus phase undetermined coefficients based on each binary fringe modulation;

an application module, configured to apply a preset system pose optimization mathematical model to determine a target inter-optical-center horizontal distance based on the initial inter-optical-center horizontal distance, the system distance magnification data, and the defocus phase undetermined coefficients;

an adjustment module, configured to adjust the system pose of the structured light system based on the target inter-optical-center horizontal distance, and construct a three-dimensional model of an object to be measured based on a triangulation method;

wherein the determination module comprises:

a defocus degree calculation submodule, configured to calculate a defocus degree based on each binary fringe modulation;

an undetermined coefficient calculation submodule, configured to calculate the defocus phase undetermined coefficients based on the defocus degree and each reference plane phase value by using a least squares principle method;

the defocus phase undetermined coefficients comprise a first undetermined coefficient of a defocus phase function, a second defocus undetermined coefficient of the phase function, and projector display chip distance data;

the application module comprises:

a partial derivation submodule, configured to perform partial derivation on the preset system pose optimization mathematical model to determine a system pose optimization mathematical partial-derivative loss function;

a loss value calculation submodule, configured to substitute the initial inter-optical-center horizontal distance, a camera working distance, projector fringe magnification data, and the projector display chip distance data from the defocus phase undetermined coefficients into the system pose optimization mathematical partial-derivative loss function to calculate a gradient loss value of the inter-optical-center horizontal distance;

a determination submodule, configured to determine whether the gradient loss value of the inter-optical-center horizontal distance converges;

a convergence determination submodule, configured to designate the initial inter-optical-center horizontal distance as the target inter-optical-center horizontal distance when the gradient loss value of the inter-optical-center horizontal distance converges;

the preset system pose optimization mathematical model is as follows:

$$h_R =$$

$$\frac{L}{\sqrt{L^2+B^2}} \frac{3S^2 TH}{\pi} \left( \sqrt{\ln\left(4E^2 Na_2^2 E_{h1} \sqrt{L^2+B^2}\, B\right) - \ln\left(V\pi\sigma_n^2(L-E_{h1})\right)} - \right.$$

$$\left. \sqrt{\frac{\ln\left(4E_{h2}\pi\left(M^2-1\right)^2 \sqrt{L^2+B^2}\, B\right) - \ln\left(4M^2 V(L-E_{h2})\right)}{2M-M^2}} \right) - \frac{Fox_y B}{L};$$

where $h_R$ is a system pose optimization value; L is the camera working distance; B is the initial inter-opticalcenter horizontal distance; S is a focal plane distance; T is a fringe period; H is the projector display chip distance data;

$$H = \frac{r}{UD}; r$$

is a distance vetween adjacent micromirrors in the projector display chip; U is an object distance between the projector display chip and a lens; D is an aperture diameter; E is a maximum gray value of preset binary fringe patterns; N is a number of the preset binary fringe patterns; $a_2$ is harmonic signal response intensity; $E_{h1}$ is a preset first height error; V is projector fringe magnification data, V=kP, k is magnification of projected fringe patterns, P is a fringe spacing on a projection target surface; $\sigma_n$ is a random noise variance; $E_{h2}$ is a preset second height error; M is a least common multiple of the number of preset binary fringe patterns and 2; $Fox_y$ is a long-side distance of a camera field of view in a longitudinal direction on a reference plane.

* * * * *